US011802683B2

(12) United States Patent
Prout et al.

(10) Patent No.: US 11,802,683 B2
(45) Date of Patent: Oct. 31, 2023

(54) DEVICE FOR ACCESSING RUNWAY LIGHTING

(71) Applicant: SGK LIFTERS PTY LTD, Mortdale (AU)

(72) Inventors: Gerard Liam Prout, Mortdale (AU); Hayssem Kadour, Mortdale (AU); Kim Thanh Du, Mortdale (AU)

(73) Assignee: SGK LIFTERS PTY LTD, Mortdale (AU)

( * ) Notice: Subject to any disclaimer, the term of this patent is extended or adjusted under 35 U.S.C. 154(b) by 195 days.

(21) Appl. No.: 16/955,727

(22) PCT Filed: Nov. 30, 2018

(86) PCT No.: PCT/AU2018/051277
§ 371 (c)(1),
(2) Date: Jun. 18, 2020

(87) PCT Pub. No.: WO2019/119024
PCT Pub. Date: Jun. 27, 2019

(65) Prior Publication Data
US 2021/0010665 A1    Jan. 14, 2021

(30) Foreign Application Priority Data
Dec. 18, 2017 (AU) ................................ 2017905043

(51) Int. Cl.
*B25B 27/14* (2006.01)
*B25B 27/02* (2006.01)
(Continued)

(52) U.S. Cl.
CPC .............. *F21V 21/40* (2013.01); *B25B 27/02* (2013.01); *B25B 27/14* (2013.01); *B64F 1/205* (2013.01); *F21W 2111/06* (2013.01)

(58) Field of Classification Search
CPC . B25B 27/02; B25B 27/14; B25B 9/00; B64F 1/205; F21V 21/40; F21V 21/04;
(Continued)

(56) References Cited

U.S. PATENT DOCUMENTS 1,488,455 A * 3/1924 Chase ...................... B65G 7/12
                                                          294/31.1
2,169,119 A * 8/1939 Blum .................. H01M 50/256
                                                         16/DIG. 15

(Continued)

OTHER PUBLICATIONS

Airfield Lighting, Manual, "12" Bidirectional High-Intensity Inset Light (IDM 4062)", Thorn Airfield Lighting, Idman and Safegate Group, Mar. 2014. [retrieved from internet Jan. 9, 2019] https://adbsafegate.com/documents/4407/en/manual-idm- 4062.

(Continued)

*Primary Examiner* — Lee D Wilson
*Assistant Examiner* — Jacob Adam Montgomery
(74) *Attorney, Agent, or Firm* — TraskBritt

(57) ABSTRACT

A device for removing a light fixture, the device comprising: a handle portion and a lever portion; the lever portion being pivotable relative to the handle portion between a first position and a second position; the handle portion having at least one abutment means; the handle portion and the lever portion defining a device body; a first arm extending from the device body, the arm having an engagement means; and wherein the first position is an engaging position in which the engagement means is engaged with a light fixture and the second position is an open position for mounting the device to the light fixture.

13 Claims, 5 Drawing Sheets

(51) Int. Cl.
*F21V 21/40* (2006.01)
*B64F 1/20* (2006.01)
*F21W 111/06* (2006.01)

(58) Field of Classification Search
CPC .............. F21V 17/002; F21W 2111/06; Y10T 29/53796; Y10T 29/53896; Y10T 29/539; Y10T 29/53909; Y10T 29/53943; Y10T 29/53991; B65G 7/12; E04G 21/162
USPC ..................... 29/278; 294/15, 902; 254/131
See application file for complete search history.

(56) References Cited

U.S. PATENT DOCUMENTS

| | | | | | |
|---|---|---|---|---|---|
| 2,590,150 | A | * | 3/1952 | Brugmann | B25B 27/0035 29/245 |
| 2,628,120 | A | * | 2/1953 | Triestram | B65G 7/12 294/31.1 |
| 3,164,893 | A | * | 1/1965 | Ashworth | B60B 31/06 29/245 |
| 3,228,720 | A | * | 1/1966 | Jordan | B25D 1/06 81/20 |
| 3,436,112 | A | * | 4/1969 | Pasquine | B65G 7/12 294/62 |
| 4,032,181 | A | * | 6/1977 | Money, Sr. | B65G 7/12 294/903 |
| 4,055,364 | A | * | 10/1977 | Breite | B65G 7/12 294/903 |
| 4,122,599 | A | * | 10/1978 | Lunycz | H05K 13/0447 29/758 |
| 4,220,366 | A | * | 9/1980 | Trudell | B25B 7/14 294/28 |
| 4,527,823 | A | * | 7/1985 | Straus | B65G 7/12 D3/315 |
| 4,678,217 | A | * | 7/1987 | Viola | B65G 7/12 294/903 |
| 6,375,162 | B1 | * | 4/2002 | Johnson | B66F 19/00 254/131 |
| 6,964,407 | B1 | * | 11/2005 | Butler | B66F 19/005 254/131 |
| 2013/0277997 | A1 | * | 10/2013 | Kersell, Jr. | B65G 7/12 294/86.4 |

OTHER PUBLICATIONS

Alstom, "Airport Equipment Installation and Maintenance Instructions and Spare Parts List for the 203mm (8") High Intensity; Inset Runway Lights Type ZA 180 Series", Issue 7, Mar. 2004. pp. 1-28. [retrieved from internet Feb. 12, 2018] https://flightl ight.com/wp-content/uploads/2017/04/imm-za-180-7.pdf.

Apex Tool Group, "Hand Tools Price List Aug. 2016", Aug. 2016, pp. 1-136. [retrieved from internet Feb. 12, 2018] http://www.a pextoolgrou p. com.a u/P DFs/ha nd_tools_cata logue_2016.pdf.

Bessey Tools, "Bessey Catalog, Clamping and Cutting Technology", Jul. 12017, pp. i-82. [retrieved from internet Feb. 12, 2018] https://www.besseytools.com/pdfs/cata logues/BESSEY_ CATALOGUE_English_2017_2018.pdf.

International Search Report for International Application No. PCT/ AU2018/051277 dated Jan. 10, 2019, 3 pages.

International Written Opinion for International Application No. PCT/AU2018/051277 dated Jan. 10, 2019, 4 pages.

Ocem, "LED Inst Runway Edge Light, LIRE, Instruction Manual For Use, Installation and Maintenance", Bologna, Italy, Nov. 3, 2004, pp. 1-37. [retrieved from internet Feb. 12, 2018] https://ocem. com/download/lire-technical-manual- english/.

* cited by examiner

DEVICE FOR ACCESSING RUNWAY LIGHTING

TECHNICAL FIELD

This application claims priority to International Application PCT/AU2018/051277 filed on Nov. 30, 2018 by Gerard Liam Prout, et al. for "Device for accessing runway lighting," which further claims priority to Australia Patent Application AU2017905043 on Dec. 18, 2017 by Kim Thanh Du et al. for "Device for accessing runway lighting." The entire disclosures of these priority applications are incorporated herein by reference.

The present disclosure is directed toward a device for removing a light fixture on a runway or maneuvering area. More particularly, the device of the present disclosure may be directed toward a tool for removing an inset light fixture from a canister on a runway or maneuvering area.

BACKGROUND

Airport lights may be inset in a canister. Typically airport light canisters are used on runways, rapid taxiways, taxiways landing platforms and other commercial air-transit locations. Airport canisters may also be referred to as "cans," which are adapted to receive inset runway lights or other industrial lights that may be suitable to receive heavy loading from a vehicle.

Commonly, these light devices are found in international airports, domestic and military airports that cannot close for maintenance, such as for changing of a light. As such, service technicians are commonly required to work to tight schedules to repair or replace lighting. In addition, technicians cannot leave tools or other items on the runway as airplane engine intake systems can be destroyed if a tool or other loose item is sucked into the intake, therefore, semi-permanent work stations on runways are not allowable. Items being taken into intake systems can cause not only damage to the aircraft, but also endanger the lives of the persons in the aircraft. As such, it is essential to have strict measures in place not only for the safety of persons in an aircraft, but also for the persons on the ground conducting maintenance.

Runway lights at an airport serve the vital purpose of adequate visual guidance for airplanes onto the runway, maneuvering in low visibility and also at night. Eventually, lights burn out, malfunction or require replacement. Airports also follow very strict regulations on the number of lights that are unserviceable before that area is out of service to aircraft. The runway lights are built to withstand extreme weather conditions, heavy traffic and runway lights are generally heavy and difficult to move. As the canisters are generally outdoors, fluids may also ingress into the location adjacent the seal of the lid to the canister and cause difficulty with removing the lid due to pressure differentials, which may be called a "water pressure lock." This may further add time and effort for removing a lid, which may substantially reduce the number of light canisters accessed over a period of time. Furthermore, a typical international airport may have between 15,000 to 50,000 light canisters, depending on the number of runways, and, therefore, maintaining and accessing lighting is a continual task that is critical for a runway.

Further, so as to minimize any protrusion from the ground, the runway lights are made generally flat and flush with the ground. This makes replacement of the lights difficult as a service technician (user) will need to extract components of the light from below the ground level. Therefore, for the foregoing reasons, there is a need for a fixture ring that allows for quick and easy installation and removal of the runway inset lights from the runway.

Canisters also have secondary insulated cables placed in them supplied from transformers and/or high current is present, which can cause injury to a service technician who is accessing the canister. For example, if a technician comes into contact with damaged, burnt, escaping electricity, live wiring or an energized part of the inset light, the technician could be injured.

As there is a vital need for all lights to be functional to provide guidance for aircraft, swapping lights is a time sensitive matter, and there is a need for accessing and replacing lights within a relatively short period of time while also maintaining safety. Further, there is a need to easily access canisters to allow for access to lights, plugs and internal components of light fittings or light fixtures.

Current methods of opening inset light fittings generally requires a pinch bar, screwdriver or other prying means to be jammed into an orifice or aperture of a light fixture to rotate the light fixture or ply open the fixture. While a number of these prying means may have a non-conductive material, they are not designed to protect a service technician from electrocution and a service technician may still be required to physically touch the canister light fixture to remove the light fixture from the canister. Current methods for removing light fixtures may be inefficient and potentially dangerous.

Any discussion of the prior art throughout the specification should in no way be considered as an admission that such prior art is widely known or forms part of common general knowledge in the field.

SUMMARY

It may be advantageous to provide a device that can assist with opening a light fixture.

It may be advantageous to provide for a device that can open a light fixture relatively more quickly than known devices.

It may be advantageous to provide for a device that can break a water pressure lock.

It may be advantageous to provide for a device that can reduce the potential for a technician to develop a repetitive strain injury.

It may be advantageous to provide for a device that is adjustable for opening different light fixtures.

It may be advantageous to provide for a device that can improve the safety of a user of the device relative to currently known devices.

It may be advantageous to provide for a modular device that may access a plurality of canisters or enclosures.

It is an object of the present invention to overcome or ameliorate at least one of the disadvantages of the prior mt, or to provide a useful alternative.

A first aspect of the present disclosure may be directed toward a device a device for accessing a light fixure, the device comprising a handle portion and a lever portion. The lever portion preferably being pivotable relative to the handle portion between a first position and a second position. The handle portion and the lever portion defining a device body and a first arm extending from the device body, the arm having an engagement means. The first position being an engaging position in which the engagement means is engaged with a light fixture and the second position is an open position for mounting the device to the light fixture.

Preferably, the engagement means may be selected from the group of a flange, a pin and a non-slip material. Preferably, an interface may be disposed between the handle portion and the lever portion, the interface may comprise a biasing means. Preferably, the biasing means biases the lever portion in the first position. Preferably, the handle portion comprises a handle grip and an abutment means. Preferably, at least one of the handle and the abutment means may be formed at least in part from a non-conductive material. Preferably, the device further comprises a magnet may be mounted handle portion. Preferably, the device further comprises a second arm with a second engagement means. Preferably, the first arm extends from the handle portion and the second arm extends from the lever portion. Preferably, the first arm and the second arm terminate at the same distance from a longitudinal axis of the handle portion. Preferably, a distal end of the lever portion comprises a lever bar. Preferably, the lever bar may be formed with at least one feature selected from the group of a texture, an undulation, an array, a protrusion, an aperture, an indent, a bump, a bead, a projection and a claw. Preferably, the lever bar extends upwardly relative to a longitudinal axis of the lever portion.

Preferably, the lever portion comprises a stopper for limiting a pivot angle of the lever portion relative to the handle portion. Preferably, the lever portion may be removable from the handle portion.

In the context of the present invention, the words "comprise," "comprising" and the like are to be construed in their inclusive, as opposed to their exclusive, sense, that is in the sense of "including, but not limited to."

The invention is to be interpreted with reference to the at least one of the technical problems described or affiliated with the background art. The present aims to solve or ameliorate at least one of the technical problems and this may result in one or more advantageous effects as defined by this specification and described in detail with reference to the preferred embodiments of the present invention.

DETAILED DESCRIPTION

Preferred embodiments of the invention will now be described with reference to the accompanying drawings and non-limiting examples.

Figure 7:
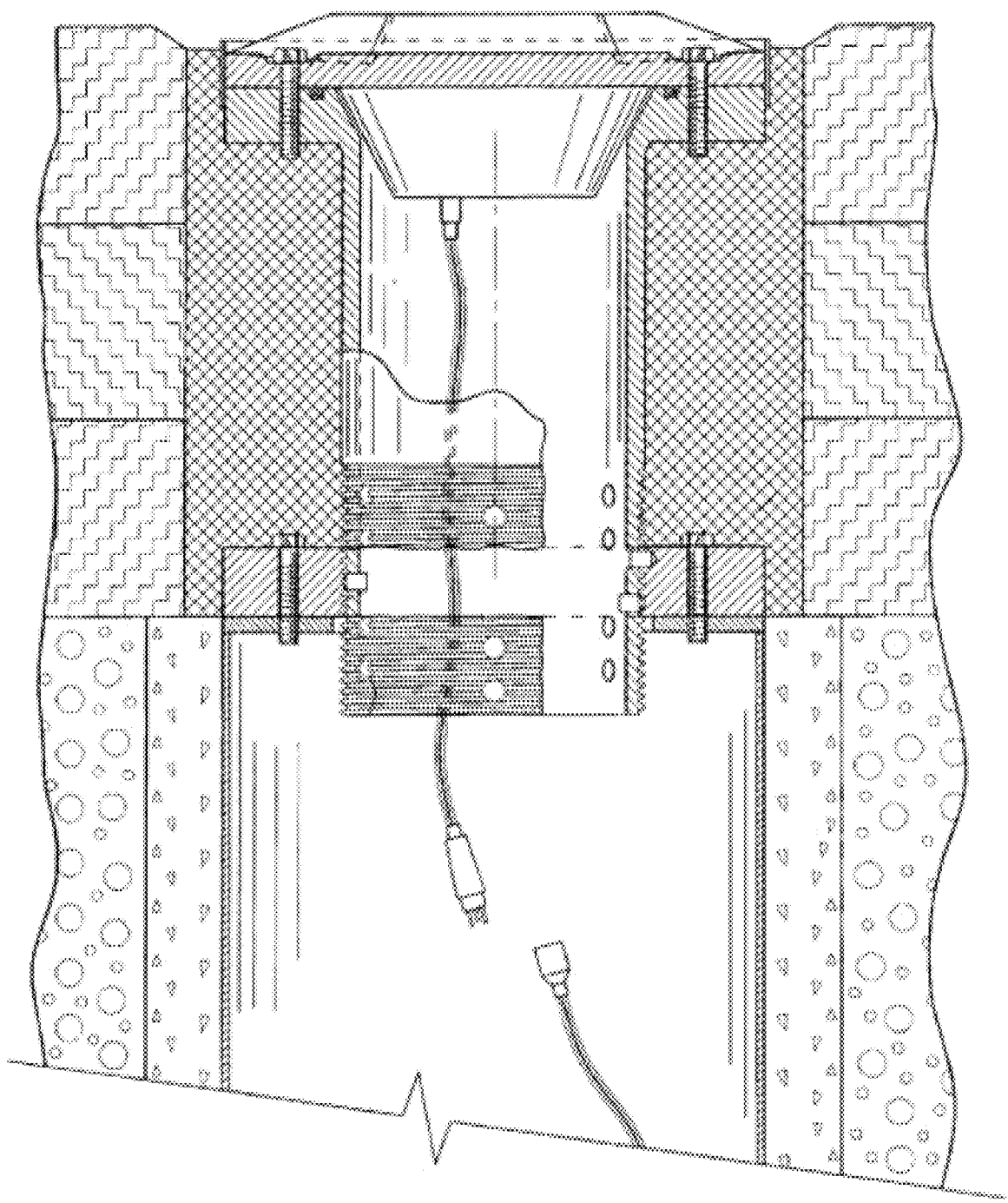
FIG. 7 illustrates an embodiment of a light canister known in the mi.

The device 10 preferably comprises a handle portion 100 and a lever portion 200, which collectively is referred to as the "body." The device 10 further comprises at least one arm 150 extending from the body. More preferably, the at least one arm 150 extends generally perpendicularly relative to the longitudinal axis of the handle 100; the longitudinal axis being shown is line A-A. The device 10 preferably comprises two arms 150 that extend in the same direction, or generally the same direction, from the body of the device 10. The arms 150 have a proximal end that is near to the body and a distal end adapted to engage with the light fixture to be moved. The arms 150 preferably comprise a flange 152 at the distal end. The flange 152 is adapted to engage with a corresponding flange, recess or aperture of a light fitting that may be seated in a canister (see Prior Art FIG. 7, for example), or a portion of a canister or any other light fixture. The flange 152 may be any desired shape, length thickness or configuration. The flange 152A comprises a bottom surface 156 and a top surface 154. The top surface 154 being rounded upwardly and may be generally hook shaped or arcuate. It will be appreciated that a "canister" may include an inset light fitting or light fixture, or any other airfield or taxiway light fitting inset in the ground. The terms "inset light fitting" and "inset light fixture" may be used herein interchangeably.

Figure 1:
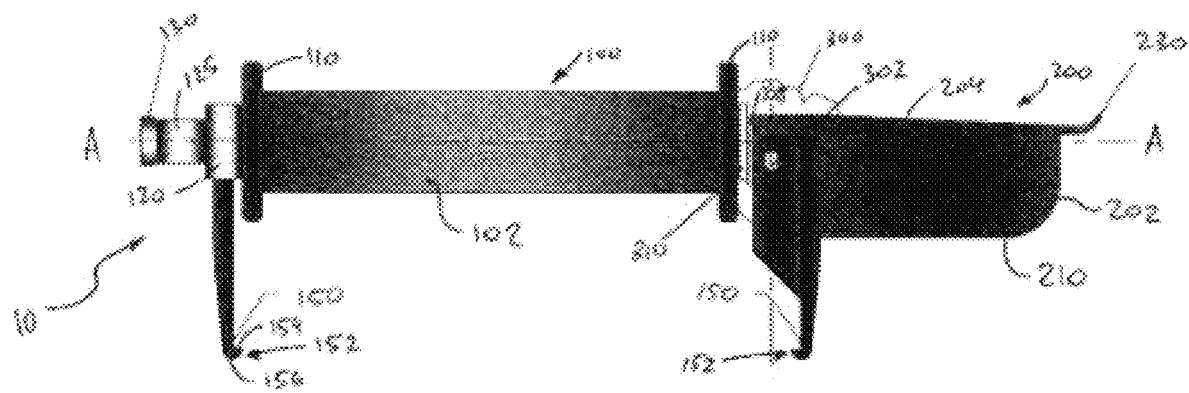
FIG. 1 illustrates a longitudinal side view of an embodiment of the device of the present disclosure.

The handle portion 100 comprises a grip portion 102 and at least one abutment means 110. It is preferred that there are two abutment means 110 as shown in FIG. 1. The abutment means 110 can be disposed at, or near to, each end of the handle grip 102. The abutment means 110 can be spaced from the handle grip 102. The handle grip 102 and the abutment means 110 are preferably formed from a non-conductive material or are at least partially covered with a non-conductive material, such as a polymer, rubber or any other suitable non-conductive material. The material for the handle grip 102 and the material for the abutment means 110 may be different, but may also be formed from the same material.

A rod or elongate element (not shown) may be passed through the handle portion 100, or part thereof. For example, if the handle grip 102 is formed with an aperture or attachment means, such as a screw, thread, or socket the abutment means 110, hub 120 and interface 300 may be attached to the handle grip 102. A hub 120 can be disposed on the distal end 106 of the handle portion 100. An arm 150 with an engagement means, such as a projection, non-slip pad or flange 152, extends from the hub 120, which can be used to grip or engage with a light canister or portion thereof. The proximal portion of the arm 150 is near to and preferably extends from the hub 120. The arm 150 mounted on the handle portion 100 may be in an abutting relationship with the abutment means 110 or formed thereon. The aim 150 may be fixed to the hub 120 and project at any desired angle therefrom.

A magnet 130 may be mounted on a hub extension 125, and the hub extension extends 125 from the hub 120. The magnet 130 may be used to hold screws, bolts or other fastening means of the canister or assist with lighting fixture removal. At a proximal end 108 of the handle portion 100 is an interface 300, which connects the handle portion 100 with the lever portion 200. The interface 300 comprises a pivot 302, a cushion 310, a stopper 320 and optionally a biasing means 308. The pivot 302 can be mounted on an interface surface (not shown) and the pivot 302 connected to the lever portion 200 on pivot surface 215. The stopper 320 of the interface 300 can be mounted on the proximal end 201 of lever portion 200 and the cushion 310 is mounted on the proximal end 108 of the handle portion 100. The stopper 320 is adapted to abut the cushion 310 when the lever portion 200 is at a maximum predetermined angle of rotation. The maximum predetermined angle of rotation may be between 0 degrees to 45 degrees, and more preferably is between 0 to 30 degrees, and even more preferably is between 0 to 20 degrees. The rotation of the lever portion 200 relative to the handle portion 100 may be in a single plane, or the lever portion may be adapted to move in more than one plane.

The lever portion 200 distal end preferably has a lever bar that can be used to pry open a canister or break a pressure lock caused by fluid within a relatively small gap between the canister body and the inset lighting fixture, for example. Various lever bars 230, 240, 250, 260 are illustrated in the figures, but any desired lever bar formation can be used. An arm 150 can be disposed on the lever portion 200. Each arm 150 of the device 10 preferably has a distal arm portion 160 that terminates at approximately the same level or same plane, such that the distal plane of the arms is generally parallel to the handle grip 102. The distal ends 160 of the arms 150 comprise a flange 152, pin or other engagement means that engages with an inset light fixture of a canister. Preferably, at rest, the longitudinal axes of the flanges 152 of the arms 150 are in the same plane; however, if the light fixture has openings, apertures or access sockets that are not in the same plane, the tool will correspond to the access socket configuration instead. Optionally, the arm 150 lengths are adjustable and retainable at a desired length.

Figure 1A:
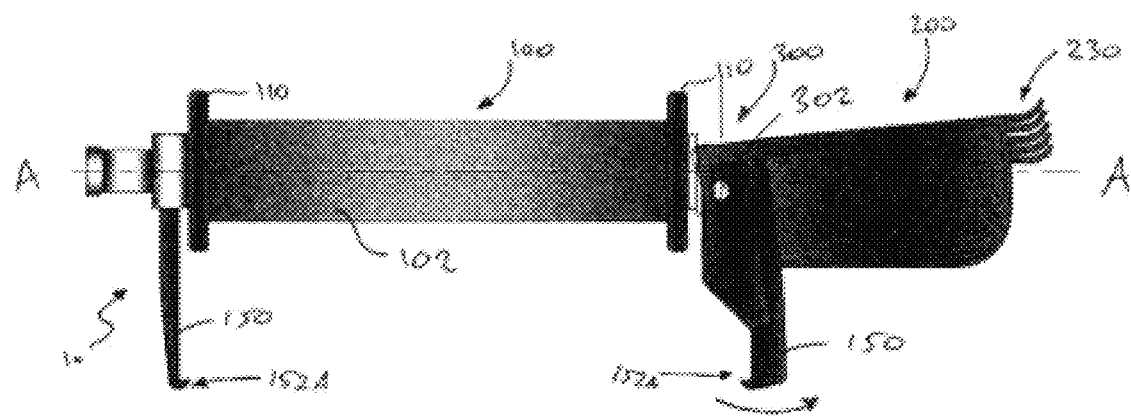
FIG. 1A illustrates a side view of an embodiment of the device of FIG. 1 in which movement of the lever portion is illustrated.
Figure 1B:
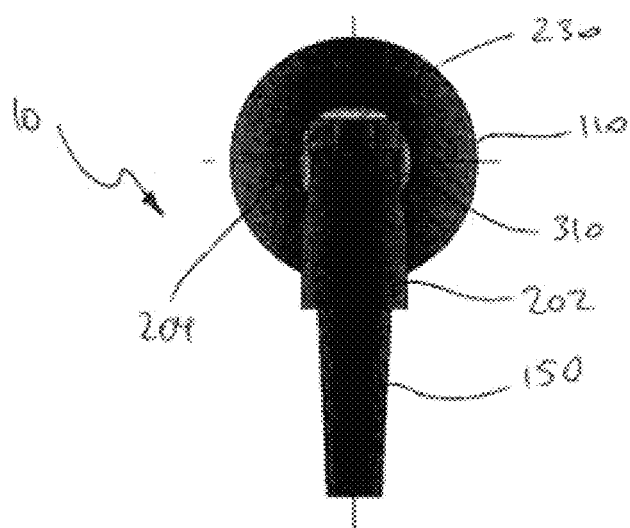
FIG. 1B illustrates an axial side view of the device of the embodiment of FIG. 1 in which the distal end of the lever portion can be seen.
Figure 1C:
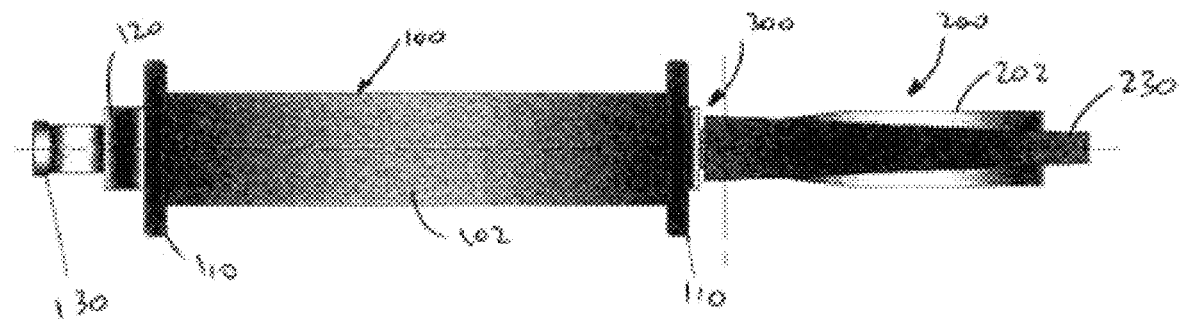
FIG. 1C illustrates a top view of the device of the embodiment of FIG. 1.

Referring to FIGS. 1 to 1C, there is shown an embodiment of a device 10 for removing inset light fitting or light fixture. The device 10 comprises a handle 100 with a length that is relatively larger than a length of the lever portion 200. The handle 100 is generally cylindrical, which is of a diameter that is between 1 cm to 15 cm, and more preferably, is approximately 6 cm to 10 cm in diameter. However, it will be appreciated that the handle grip 102 will be of a sufficient diameter to be grasped by a user. The handle grip 102 may have at least one texture formed thereon to assist with gripping the handle grip 102. A pair of abutment means 110 may be disposed adjacent to the handle grip 102 such that a user holding the handle grip is not likely to have their fingers touch the inset light of the canister when using the device 10. In this way the potential for the user to be electrocuted when using the device 10 to remove a light fixture is reduced.

The abutment means 110 can be formed from the same material as the handle grip 102. It is preferred that at least the external surface of the handle grip 102 and/or the abutment means 110 is covered, at least in part, by a non-conductive material. In another embodiment, the abutment means 110 may not be used to abut the light fixture in use, but rather to prevent a technician or user of the device from accidentally touching the canister or light fixture when gripping the handle grip 102.

The handle grip 102 may have a longitudinal axis, which is shown as dashed line A-A in FIG. 1. An aperture (not shown) may be formed in the direction of the longitudinal axis A-A through the handle, which allows for a rod or other elongate element to be inserted therein. Alternatively, the handle grip 102 may instead have any suitable attachment means, such as a threaded portion that extends in the direction of the longitudinal axis that can accept a corresponding threaded element, such as a bolt. For example, a hub may have a threaded attachment means (not shown) that can be received by the handle grip 102 to attach the hub 120 to the handle grip 102, or vice versa. It will be appreciated that the threaded portion may extend away from the handle grip 102 and may have an element mounted thereon. Such an element mounted thereon can be an abutment means 110, or a hub 120, for example. The hub 120 may have an arm 150 extending therefrom. The arm 150 may be integrally formed with the hub 120, or may be removably connected thereto. Preferably, the arm 150 can be removed to allow the arms 150 to be interchanged with a further arm for interacting with different light fixtures. Removing the arm 150 may also allow for replacement of a damaged arm 150, or for more compact storage of the device 10 when not in use. In an unillustrated embodiment, at least one of the arms 150 can be folded or orientated to be substantially parallel to the longitudinal axis.

Optionally, the lever portion 200 is removable from the handle portion 100. The lever portion 200 may be formed from a hardened steel or any other predetermined material with at least one desired property selected from the group of rigidity, strength, toughness, hardness and/or ductility. The lever portion has a proximal end 201 and a distal end 203. The proximal end 201 of the lever portion 200 is near to the handle 100 and the distal end comprises a lever bar. The lever bar may have any predetermined shape and may be removably mounted to the lever portion 200 or integrally fanned therewith. As illustrated in FIG. 1 and FIG. 1A, the lever bar 230 comprises a curved portion 231 and a lip portion 232. The curved portion 231 of the lever bar is preferably such that the lip portion is around 60 to 80 degrees turned upwardly relative to the longitudinal axis. The lever bar may be used to break a "pressure lock," which can be caused by water or another liquid near to the seal of the container.

Optionally, the handle length can be adjusted to allow for sizing of the handle 100 for different size light fixtures. The handle 100 may be telescopic such that the desired length may be selected for the fixture to be removed. In this embodiment, the telescopic handle grip 102 can be locked or retained in the desired length position such that in use the device handle grip 102 does not extend or contract in length. For example, a locking pin (not shown) may be used to retain the handle grip 102 in a desired configuration, or a friction locking means may be adapted to do the same.

In another embodiment, the handle portion 100 can be separable, and an extension element attached to the handle portion to allow for a desired length of the handle portion 100. Adjusting longitudinal length of the handle portion 100 can be used to adjust the relative spacing of the arms 150.

As shown in FIG. 1A the lever portion 200 being moved relative to the handle 100. The lever portion 200 may be adapted to rotate about a fulcrum point between 0 to 30 degrees, or any other desired pivot range. Other pivot ranges may be −10 degrees to 30 degrees, 0 degrees to 25 degrees, 0 degrees to 20 degrees, 0 degrees to 15 degrees, or any other predetermined range. It will be appreciated that the angle of rotation may be negative (move below the longitudinal axis) or may be any desired integer. The fulcrum point may be pivot 302 that is attached to pivot surface 215. The pivot surface 215 may have at least one edge bound by arm 150 of the lever portion 200 and the top lever flange 204 as is shown in FIGS. 1 and 1A. The pivot 302 may optionally be offset relative to the longitudinal axis of the handle grip 102. As shown, the pivot 302 is offset relatively below the longitudinal axis of the handle grip 102. The rotation of the lever portion 200 may include a retaining means such as a crank or ratchet means such that the lever portion 200 may be fixed or held in a predetermined angle until released. In another embodiment, a user may physically hold the lever portion 200 at the predetermined angle if there is no retaining means on the device 10.

Rotating or pivoting the lever portion 200 at a predetermined angle may allow for easier or guided mating of the device 10 with a canister light fixture. When the lever portion 200 is held at a desired angle a first arm 150 of the handle portion 100 can be engaged with the canister light fixture, and when the first arm is engaged with the light fixture the lever portion 200 can be released from the desired angle such that the arm 150 on the lever portion can also engage with the light fixture. Preferably, after any bolts or fastening means have been removed from a cover, the arms 150 of the device 10 can be used to engage with a recess or aperture of the light fixture. Once both arms 150 are engaged with the light fixture, the device 10 handle grip 102 may be rotated to release the light fitting from the canister, if the canister is required to be opened via rotation. Once the light fixture has been rotated (if required), the lever bar 230, 240, 250, 260 on the lever portion 200 may optionally be used to wedge open the light fixture from the canister if there is difficulty in removing the light fitting. The device 10 may then again be used to engage with the cover of the canister to lift the cover from the canister. It will be appreciated that other light fixture types may also be removed from a canister by the device 10.

In addition, lifting the light fixture from the canister with the device 10 may allow for a relatively perpendicular lifting of the inset light fixture relative to the ground, such that the light fixture is generally lifted axially relative to the axis of the canister. In this way the seal between the canister and the inset light fixture can be preserved or remain generally free of damage from the removal of the inset light fixture. Damage may be incurred via current removal methods, such as by wedging in a screwdriver, which could impact and damage the seal, or by urging and lifting the inset light fixture at an angle that is not generally perpendicular to the axis of the canister. Further, preferably, using the device 10 removes the need to twist the light fixture when removing it from the canister, which could also damage the seal.

FIG. 1B shows a side view of the longitudinal axis of the device 10. The arm 150 of the lever portion 200 is projecting downwardly and in this orientation could be used to engage with a light fixture relatively downward from the longitudinal axis. The bottom lever flange 202 is formed to connect with the top lever flange 204. The bottom lever flange 202 is tapered to match the top lever flange width where the bottom and top lever flanges 202, 204 connect. A web 210 preferably extends between top lever flange 204 and bottom lever flange 202. The web 210 may have a plurality of apertures or textures (not shown). A lever bar 230 extends from the lever portion 200. The sides 214, 216 of the top lever flange 204 are tapered with the widest portion being near to the proximal end of the lever portion and narrowing near to the distal end of the lever portion 200. The top surface of the top lever flange 204 may also be tapered toward the lever bar 230. A cushion 310 is shown to which the lever stopper 320 can abut when the lever portion 200 is actuated.

FIG. 1C illustrates a top view of the embodiment of FIG. 1. As is illustrated in this embodiment, the handle grip 102 and abutment means 110 of the device 10 are cylindrical along axis A-A. The lower lever flange 202 can be seen to be generally wider than that of the top lever flange 204. The central axis of the lever portion 200 is generally aligned with the central axis of the handle portion 100 such that longitudinal axis A-A extends through both the handle portion 100 and the lever portion 200. The lever bar 230 extends distally from the top lever flange 204. The top lever portion 204 and the bottom lever portion 202 may be flat, undulating, curved, textured or any other predetermined shape.

Figure 2:
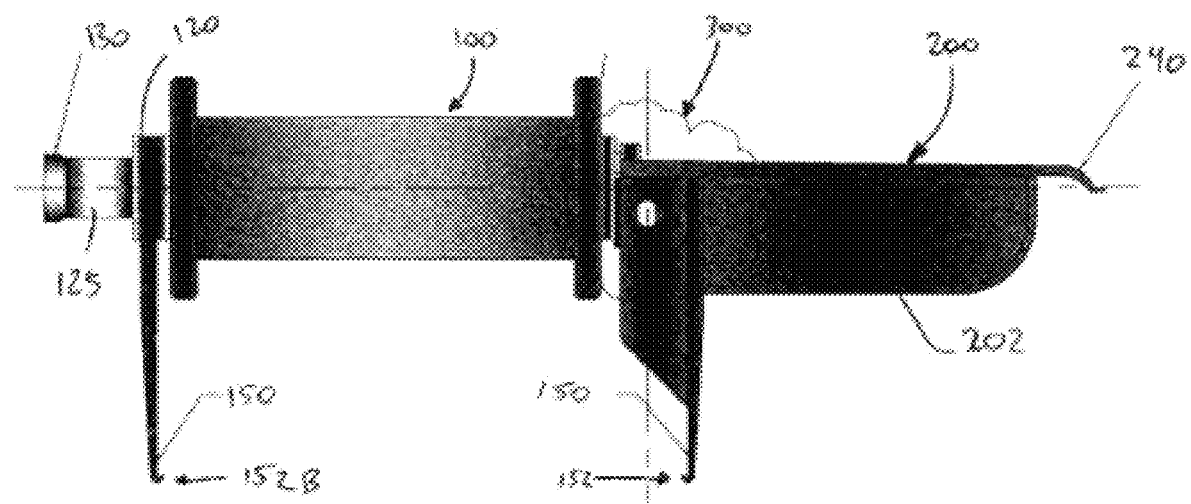
FIG. 2 illustrates a top view of the embodiment of the device of FIG. 1.

Referring to FIG. 2, there is shown a further embodiment of the device 10 in which the handle cross-sectional area has been increased and the length of the handle grip 102 has been reduced, relative to that of FIG. 1. The lever portion 200 as illustrated discloses a further lever bar 240 formation. The lever bar 240 projects in the same direction of the top lever flange 204. The distal most portion of the lever bar 240 curves downwardly then curves upwardly such that a tip of the lever bar 240 can be insulted into a gap and the upward curvature of the lever bar 240 can be used as a fulcrum. Flanges 152B of the arms 150 have a rounded bottom surface 156 and a flat top surface 154, in which the top surface is adapted to abut and engage with a light fixture.

The lever portion 200 comprises a lever stopper 320 on the surface of the top lever flange 204 at the proximal end 201. The stopper 320 is adapted to abut the cushion 310 or be rotated toward cushion 310 and a biasing means 308 prevents the stopper 320 from abutting the cushion 310. The biasing means 308 may be a spring, rubber element, compressible material, shape memory material, elastomeric material or any other element that can be used to bias the lever portion 200 to a desired orientation. Preferably, the biasing means 308 is elastically deformable. Optionally, the biasing means 308 may be a compression member or compression element that elastically deforms and returns the lever portion 200 back to a biased position, which may also be referred to as a "first position." The device 10 may be in either an engagement position (first position), or a pivoted position (second position). In other embodiments, the device 10 can be in an engagement position (first position) or a resting position (second position).

Figure 3:
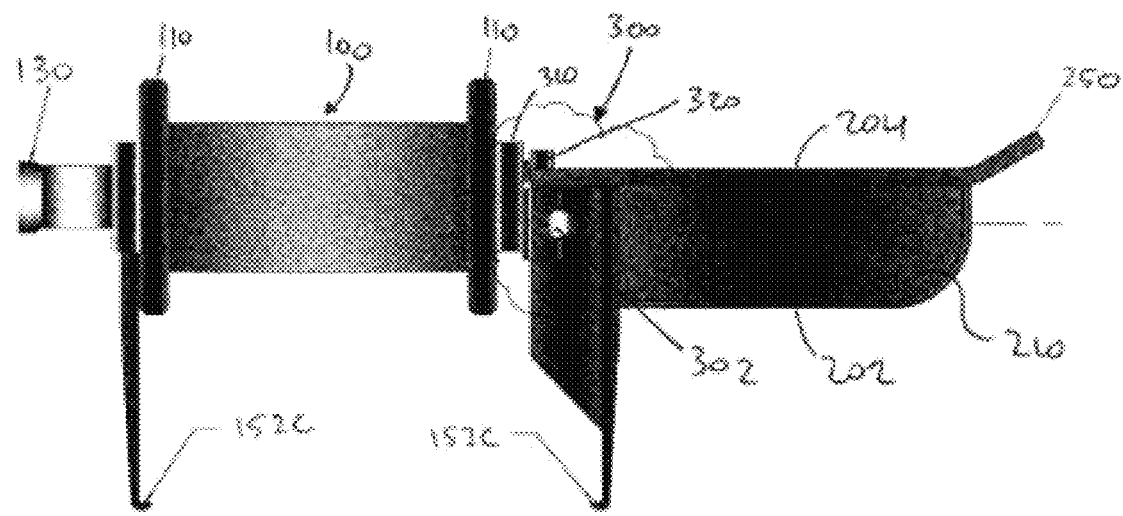
FIG. 3 illustrates a side view of a further embodiment of the device with a further a lever bar formation and arm flange formation.

Turning to the embodiment of FIG. 3, there is illustrated a further embodiment of a lever portion 200 in which the top lever flange 204 has a flat surface that is of a uniform thickness and a lever bar 250 that extends distally of the top lever flange 204. The top lever flange 204 projects at an angle upwardly relative to the longitudinal axis of the lever portion 200. The flanges 152C on the arms 150 are fanned with a relatively flat flange bottom surface 156 and a generally flat flange top surface 154. The corners and/or edges of flanges may be rounded or contoured.

It will be appreciated that a first arm 150 may have a first flange 152 shape, and a second arm 150 may have a second flange 152 shape. In an unillustrated example, the first arm 150 may have flange 152B and the second arm 150 may have flange 152D.

Figure 4:
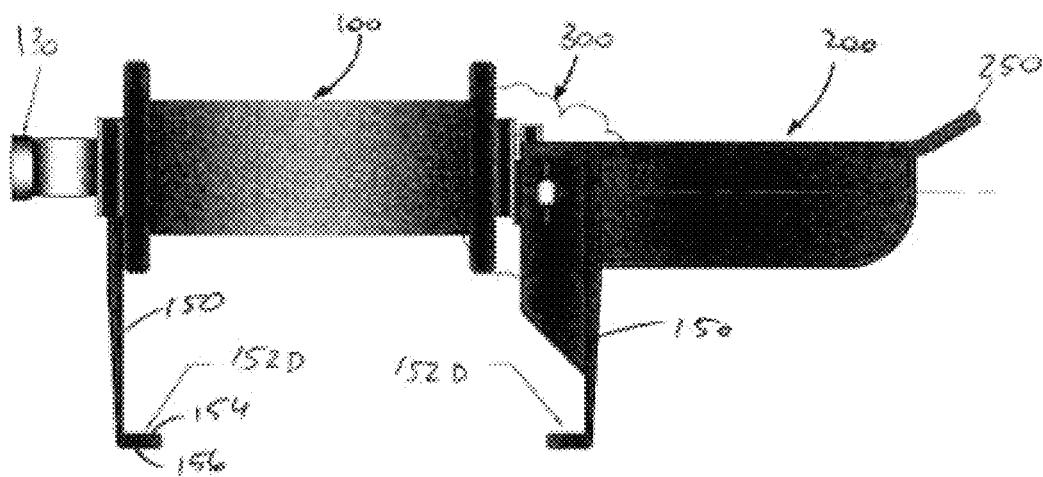
FIG. 4 illustrates a side view of a further embodiment of the device in which the device has a widened and rounded lever bar.

FIG. 4 illustrates a further flange 152 embodiment, flange 152D, at the distal end of the arm 150. The flange 152D is formed such that it projects at a generally perpendicular angle relative to the arm 150 the flange 152D illustrated has a relatively larger cross-sectional area than the distal end of the arm 150. In addition, the arm 150 is tapered such that the flange can be mounted in the corresponding groove or aperture of the light fixture. Optionally, the corners of the arm 150 and/or the flange 152 may be rounded, at least on the contact portion of the flange 152. The flange 152 may have any desired shape, such as a square, rectangle, triangle, circular, irregular, or any other desired shape. In addition, the flange 152 may optionally have a texture such as at least one of a ribbing, array of protrusions, array of apertures or any other desired undulation or projection. The texture on the flange 152 may assist with gripping the light fixture and reducing the potential for the light fixture slipping or falling from the device 10 once gripping and removed.

Figure 4A:
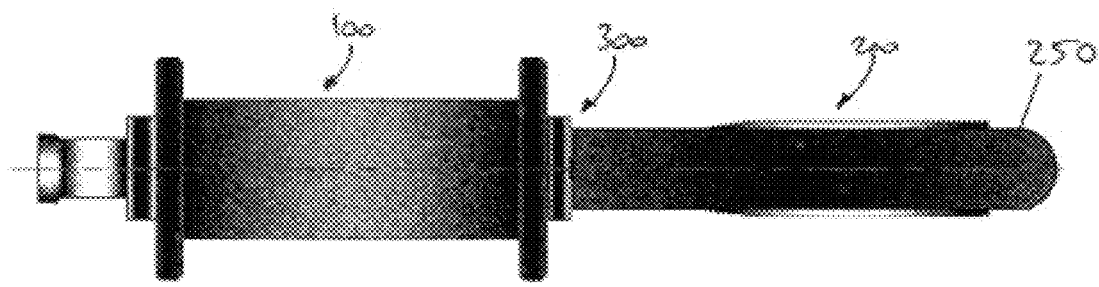
FIG. 4A a top down view of the embodiment of FIG. 4, in which the lever bar has a width generally corresponding to the width of the proximal portion of the top lever flange.

FIG. 4A shows a top view of the device shown in FIG. 4. The lever portion 200 comprises a top lever flange 204 and a bottom lever flange 202. The top lever flange 204 as shown has substantially a uniform cross-section and parallel longitudinal sides 206 and 208. The lever bar portion 250 extends distally from the top lever flange 204. Preferably, the lever bar portion 250 comprises a texture or an array of textures that may assist with gripping or reducing the potential for the lever bar 250 to slip during use. The lever bar may also be in the form of a pinch bar head (duckbill head), claws, pile, or hooligan tool end (also known as a "halligan bar"). The lever bar 250 can be disposed at and desired angle. As shown, the lever bar 250 projects at around 20 degrees upwardly relative to the axis A-A. However, it will be appreciated that the lever bar projection 250 can be disposed at any desired angle in the range of 240 degrees to 120 degrees (−120 degrees to 120 degrees). While there are various embodiments of the lever bar 230, 240, 250 and 260 shown, other configurations and formations may be used for the device 10.

Figure 5:
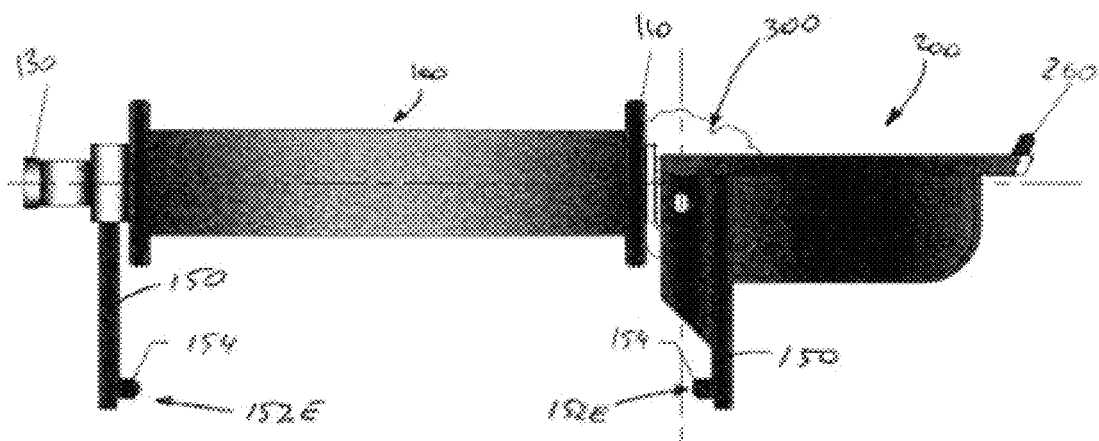
FIG. 5 illustrates a side view of a further embodiment of the device with the arm flanges shown as pins.
Figure 5A:
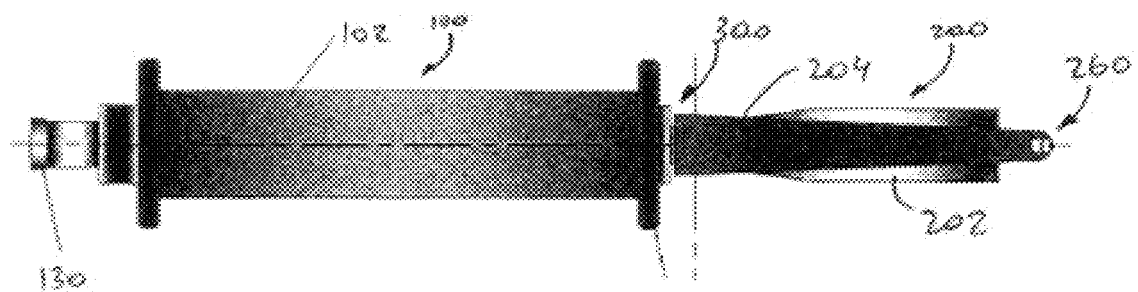
FIG. 5A illustrates a top down view of the embodiment of FIG. 5 in which the lever bar has a lever bar pin.

A further embodiment of the arms 150 are shown in FIGS. 5 and 5A. The flanges 152E are shown as pins. The flanges 152E are generally circular or may be keyed to fit in a corresponding groove or aperture of a light fixture. The flanges 152E are disposed at the distal ends of the arms 150 but a portion of the arms 150 extends below the flanges 152E. The space between the distal tip of the arm 150 and the flange 152E may reduce the potential for the flanges 152E to deform during use. In addition, the arms 150 are shown as having a generally regular cross section along the length of the arms 150. The cross section of the arms 150 may be square, rectangular, ovoid, or any other predetermined cross-sectional shape.

The lever bar 260 of the lever portion 200 is shown as an extension of the top lever flange 204 with a lever pin disposed thereon. The lever pin of the lever bar 260 may be generally the same shape as that of the flange 152E and may be used to break a pressure lock or assist with removing a light fixture from a canister. The distal end of the lever bar 260 may be rounded or shaped at a sharp angle and may be used similar to a pry bar or pinch bar.

Figure 6:
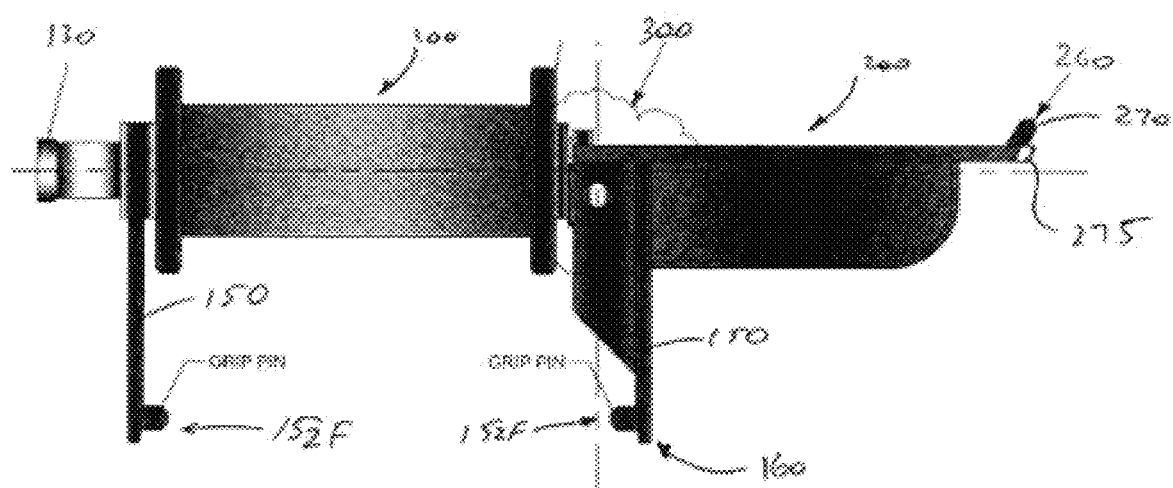
FIG. 6 illustrates a side view of a further embodiment of the device with a shortened handle grip and arm flange pins.
Figure 6A:
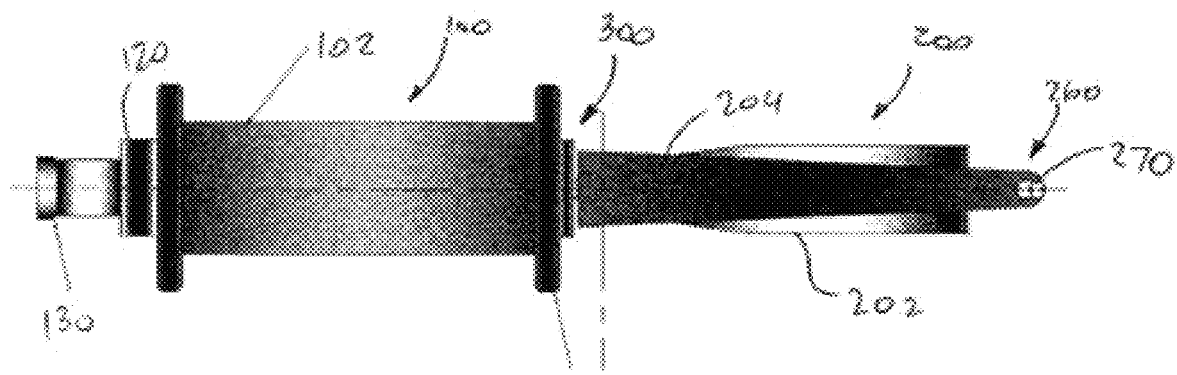
FIG. 6A illustrates a top down view of the embodiment of FIG. 6.

FIGS. 6 and 6A illustrate a similar embodiment as that of FIGS. 5 and 5A, respectively. These images differ in that FIGS. 6 and 6A illustrate relatively larger pin diameter (flange 152F) relative to that of the lever bar 260 lever pin 270. The lever pin 270 may have a head portion and a shaft portion. Further the lever bar 260 may have a distal end shaped at an angle to form a wedge 275. The head portion may be rounded or shaped to fit within an aperture or access socket of a light fixture.

The length of the handle portion 100 length may dictate the length of the lever portion 200. For example, the length ratio of the handle portion 100 relative to the lever portion 200 may be 2:1, 1.5:1, 1:1, 0.9:1, 0.8:1, 0.5:1 or any other predetermined ratio. Further, the length of the handle portion 100 may also correspond to the cross-sectional area of the handle grip 102.

It will be appreciated that the handle portion 100 and the lever portion 200 may be swapped or interchanged for different applications. For example, if the device of FIG. 1 is required and the lever portion of FIG. 2 is desired, the lever portion as shown in FIG. 1 may be removed and replaced by the lever portion of FIG. 2. In this way, the device can be considered to be modular. The modularity of the device 10 may also extend to other components to a higher level of customization and use for a plurality of lighting canisters or light fixtures to be interacted with.

The handle portion 100 is preferably formed, or coated, or encapsulated or overmolded (overmoulded) with a non-conductive material on the outer surface and comprises a rigid core or rigid body. The handle portion 100 may be formed from a single material, such as a polymer or a metal. The non-conductive material may include at least one of the materials selected from the group of Low-density polyethylene (LDPE), High-density polyethylene (HDPE), Polypropylene (PP), Polystyrene (PS), Polytetrafluoroethylene (PTFE), Polyvinylchloride (PVC), Polychlorotrifluoroethylene (PCTFE), enamel, polyurethane, polyester, nylon, rubber, concrete, fiberglass, polyimide or any other corrosion resistant polymer. Preferably, any non-conductive material on the handle is sufficient to prevent electrical arcing from the handle to the user.

Further, the handle portion 100 and or the lever portion 200 may be formed from hardened steel, carbon fiber, metal alloys, aluminum, zincalurne, and other materials may be used to form a portion of the device 10. For example, the lever portion 200 may be formed from a high carbon steel to be used effectively as a pry bar without deformation of the lever portion 200. A plurality of materials may be used to form the device 10.

The handle 100 can be formed with finger grooves or contours for ergonomic purposes. The handle 100 may further be formed with a curve or other desired predetermined shape, such as a shape that corresponds to the general shape of the light fixture to be removed. Adjacent to the handle an abutment means 110 may be provided such that the handle 100 is elevated from the surface of the light fixture. Preferably, elevating the handle 100 from the light fixture may allow for the user to make a secure grip with the handle 100 for removing the fixture of the light canister without the user coming into a dangerous proximity of the light fixture.

In an unillustrated embodiment, the device 10 may have an electronic torque means or electronic removal means. The electronic rotation means may allow for the light fixture to be rotated via an electronic means rather than a manual rotational force provided by the user. The rotation can be imparted to the light fixture after the light fixture has been gripped by the engagement means (flanges 152) of the arms 150.

Alternatively, the removal means may allow for lifting of the light fixture in the direction of the longitudinal axis of the canister such that the seal between the canister and the light fixture is not damaged.

Further, extension elements (not shown) may be attached to at least one of the lever portion 200 and/or the handle portion 100 such that a rotation of the device 10 is manually easier for a user. If extension elements are used with the device 10, the extension elements may be shaped to be mounted over the hub portion 120 or on the hub extension 125 of the handle portion 100, or may be attached to the lever bar 230 or the top lever flange 204 of the lever portion 200. In yet another embodiment, the extension element may be a T-handle that can be attached to the device 10 at any desired location. Preferably, the T-handle is attachable to the handle portion such that the rotation can be effected from a generally central location of the light fixture.

It will be appreciated that the arm portion 150, flange 152 of the arm and the lever bar 230 may be any desired shape or configuration. For example, the flange 152 of FIG. 1 may be used with the arm configuration of FIG. 5 and the lever bar 240 of FIG. 2 may be used. Optionally, at least one of the arm 150, flange 152 and/or the lever bar 230, 240, 250, 260 may be interchangeable. The lever portion 200 of the device 10 may be formed as a unitary piece.

In yet a further embodiment, the hub 120 may have a plurality of arms 150 extending therefrom, which have varying arm thicknesses and/or flanges 152 for different applications. In this unillustrated embodiment, the arms may be locked or held in place when for use by a retaining means (not shown). In this way the device 10 arms 150 need not be removed and replaced, but rotated or swapped into position.

Optionally, a reflective tape or reflective paint may be applied to the device to allow for easily seeing the device in dark conditions or in wet conditions. Preferably, a fluorescent color such as orange, green, pink, yellow or any other predetermined desired color may be used on the device.

Although the invention has been described with reference to specific examples, it will be appreciated by those skilled in the art that the invention may be embodied in many other forms, in keeping with the broad principles and the spirit of the invention described herein.

The present invention and the described preferred embodiments specifically include at least one feature that is industrially applicable.

The invention claimed is:

1. A device for removing a light fixture, the device comprising:
   a handle portion and a lever portion;
   the lever portion being pivotable relative to the handle portion between a first position and a second position;
   the handle portion having a handle grip and at least one electrically non-conductive abutment element positioned at a distal end of the handle grip;
   an elastomeric compression biasing element disposed between a proximal end of the handle portion and the lever portion at an interface between the handle portion and the lever portion;
   a hub element disposed on a distal end of the handle portion opposite the interface between the handle portion and the lever portion;
   a first arm extending from the hub element at least substantially orthogonal to a longitudinal axis of the handle portion, the first arm having a first engagement member;
   a second arm having a second engagement member;
   wherein the first position is an engaging position in which the first and second engagement members are configured to be engaged with said light fixture and the second position is an open position for mounting the device to said light fixture; and
   wherein the first arm is detachable from the hub element.

2. The device as claimed in claim 1, wherein the first and second engagement members comprise a flange, a pin or a non-slip material.

3. The device as claimed in claim 1, wherein the biasing element biases the lever portion in the first position.

4. The device as claimed in claim 1, wherein the handle portion comprises the handle grip and a pair of abutment elements, each abutment element positioned at a longitudinal end of the handle grip.

5. The device as claimed in claim 4, wherein at least one of the handle portion and the pair of abutment elements is formed at least in part from a non-conductive material.

6. The device as claimed in claim 1, wherein the device further comprises a magnet mounted on the handle portion.

7. The device as claimed in claim 6, wherein the first arm extends from the handle portion and the second arm extends from the lever portion.

8. The device as claimed in claim 6, wherein the first arm and the second arm terminate at the same distance from the longitudinal axis of the handle portion.

9. The device as claimed in claim 1, wherein a distal end of the lever portion comprises a lever bar.

10. The device as claimed in claim 9, wherein the lever bar is formed with at least one feature comprising a texture, an undulation, an array, a protrusion, an aperture, an indent, a bump, a bead, a projection or a claw.

11. The device as claimed in claim 9, wherein the lever bar extends upwardly relative to a longitudinal axis of the lever portion.

12. The device as claimed in claim 1, wherein the lever portion comprises a stopper that limits a pivot angle of the lever portion relative to the handle portion.

13. The device as claimed in claim 1, wherein the lever portion is removable from the handle portion.

* * * * *

UNITED STATES PATENT AND TRADEMARK OFFICE
CERTIFICATE OF CORRECTION

PATENT NO.      : 11,802,683 B2
APPLICATION NO. : 16/955727
DATED           : October 31, 2023
INVENTOR(S)     : Gerard Liam Prout, Hayssem Kadour and Kim Thanh Du It is certified that error appears in the above-identified patent and that said Letters Patent is hereby corrected as shown below:

In the Specification

| | | |
|---|---|---|
| Column 2, | Line 23, | change "fixture or ply open" to --fixture or pry open-- |
| Column 2, | Line 55, | change "the prior mt," to --the prior art,-- |
| Column 2, | Line 58, | change "toward a device a device for" to --toward a device for-- |
| Column 2, | Line 58, | change "light fixure, the" to --light fixture, the-- |
| Column 4, | Line 4, | change "in the mi." to --in the art.-- |
| Column 4, | Line 62, | change "The aim 150" to --The arm 150-- |
| Column 6, | Line 32, | change "fanned therewith." to --formed therewith.-- |
| Column 6, | Line 53, | change "Adjusting longitudinal" to --Adjusting the longitudinal-- |
| Column 8, | Line 19, | change "be insulted into" to --be inserted into-- |
| Column 8, | Line 48, | change "arms 150 are fanned" to --arms 150 are formed-- |
| Column 10, | Line 25, | change "aluminum, zincalurne, and" to --aluminum, zincalume, and-- |

Signed and Sealed this
Thirtieth Day of January, 2024

*Katherine Kelly Vidal*
Katherine Kelly Vidal
*Director of the United States Patent and Trademark Office*